(12) United States Patent
Ke et al.

(10) Patent No.: US 9,640,842 B2
(45) Date of Patent: May 2, 2017

(54) STRUCTURAL IMPROVEMENT OF UPPER COVER OF INTELLIGENT STORAGE BATTERY

(71) Applicant: ZHANGZHOU HUAWEI POWER SUPPLY TECHNOLOGY CO., LTD, Fujian (CN)

(72) Inventors: Zhimin Ke, Fujian (CN); Weixin Cai, Fujian (CN)

( * ) Notice: Subject to any disclaimer, the term of this patent is extended or adjusted under 35 U.S.C. 154(b) by 100 days.

(21) Appl. No.: 14/765,348

(22) PCT Filed: Mar. 8, 2013

(86) PCT No.: PCT/CN2013/072325
§ 371 (c)(1),
(2) Date: Aug. 3, 2015

(87) PCT Pub. No.: WO2014/121533
PCT Pub. Date: Aug. 14, 2014

(65) Prior Publication Data
US 2015/0380775 A1    Dec. 31, 2015

(30) Foreign Application Priority Data

Feb. 7, 2013  (CN) .................... 2013 2 0071058 U

(51) Int. Cl.
*H01M 10/42* (2006.01)
*H01M 2/04* (2006.01)
*H01M 10/48* (2006.01)

(52) U.S. Cl.
CPC ......... *H01M 10/4257* (2013.01); *H01M 2/04* (2013.01); *H01M 10/488* (2013.01)

(58) Field of Classification Search
CPC ... H01M 10/4257; H01M 10/488; H01M 2/04
See application file for complete search history.

(56) References Cited

U.S. PATENT DOCUMENTS

2013/0164567 A1* 6/2013 Olsson ............... H01M 10/488
429/7
2015/0132617 A1* 5/2015 Petruzzi ............. H01M 10/488
429/53

FOREIGN PATENT DOCUMENTS

CN    WO 2014121532 A1 *  8/2014  .......... H01M 10/425

* cited by examiner

*Primary Examiner* — Jane Rhee
(74) *Attorney, Agent, or Firm* — Prakash Nama; Global IP Services, PLLC

(57) ABSTRACT

A structural improvement of an upper cover of an intelligent storage battery is provided. A circuit mounting area and a terminal mounting area are provided on the upper surface of its upper cover body. A cap covers the circuit mounting area. A LCD screen and a circuit board are mounted on an inner lateral surface of a to plate of the cap. A conductive adhesive tape is clamped between one end of the LCD screen and a corresponding lateral plate of the cap. A connection terminal in corresponding contact with the bottom of the conductive adhesive tape is arranged on the circuit board. The top plate inclines downward and outward. The inclined plate has a larger mounting area, and can accordingly be provided with a LCD screen which has a larger area; and the conductive adhesive tape is staggered with the edge of the circuit board.

6 Claims, 4 Drawing Sheets

STRUCTURAL IMPROVEMENT OF UPPER COVER OF INTELLIGENT STORAGE BATTERY

BACKGROUND OF THE INVENTION

The present invention relates to an intelligent storage battery, specifically the structure of an upper cover of an intelligent storage battery.

Structure of an existing intelligent storage battery generally comprises a main body and an upper cover at a top opening of the main body. The upper cover is generally divided into three big areas, namely a liquid adding area, a terminal mounting area and a circuit mounting area. The liquid adding area is generally disposed within a liquid adding tank which is arranged on a side of a width direction of the upper cover, the length of which approximately equals the length of the upper cover. The liquid adding area occupies a width about a half of the width of the upper cover, or slightly more. The circuit mounting area and two terminal mounting areas are distributed on another side of the width direction of the upper cover. The two terminal mounting areas are respectively located at two ends of the circuit mounting area. The total length of the circuit mounting area and the two terminal mounting areas also approximately equals the length of the upper cover.

A cap is fixedly covered on the circuit mounting area. The circuit board of the intelligent storage battery is mounted on the circuit mounting area. A liquid crystal display screen of the intelligent storage battery is installed on an inner lateral surface of a top plate of the cap. A conductive adhesive tape is clamped between one end of the liquid crystal display screen and a corresponding lateral plate of the cap. A connection terminal which is in corresponding contact with the bottom of the conductive adhesive tape for electrical connection and is formed by copper-cladding is arranged on the circuit board. The top plate of such existing cap is of a planar structure parallel to the bottom of the circuit mounting area. Such top plate of a planar structure has deficiencies in two aspects:

1. Due to the limited width of the circuit mounting area, the width of the top plate corresponds to the width of the circuit mounting area; the installation width of the liquid crystal display screen is limited by the width of the top plate. Thus, the largest installation width for the liquid crystal display screen is the circuit mounting area width minus the wall thickness of the cap's corresponding lateral surface; the width of the liquid crystal display screen is smaller; the display effect is poorer.

2. As shown in FIG. 7, in order to prevent the connection terminal 31 formed by copper-cladding on the circuit board 3 from sticking up and detaching during plate cutting, the connection terminal 31 should be disposed at a certain distance from the edge of circuit board 3, typically 0.4 mm. The planar structure of the top plate of such an existing cap results in alignment of the bottom of the conductive adhesive tape and the edge of circuit board 3 (as shown in FIG. 6). The distance of 0.4 mm affects the connection reliability between the conductive adhesive tape and the connection terminal 31, thereby affecting the reliability of electrical connection between the two.

In view of the above, the present inventors conducted in-depth study of the above deficiencies of existing upper cover of an intelligent storage battery and proposed a structural improvement of an upper cover of an intelligent storage battery, resulting in the present application.

BRIEF SUMMARY OF THE INVENTION

An object of the present invention is to provide a structural improvement of an upper cover of an intelligent storage battery which could enlarge the installation width of the liquid crystal display without changing the width of the circuit mounting area, resulting in larger width of the liquid crystal display screen and better display effect.

Another object of the present invention is to provide a structural improvement of an upper cover of an intelligent storage battery which could make the bottom of the conductive adhesive tape stagger with the edge of the circuit board and in large-area reliable contact with the corresponding connection terminal formed by cladding copper on the circuit board.

To achieve the above objects, the present invention adopts the following technical proposal:

A structural improvement of an upper cover of an intelligent storage battery comprises an upper cover body with a liquid adding tank disposed on an upper surface thereof; the upper surface of the upper cover body is also provided with a circuit mounting area and terminal mounting areas; a cap is fixedly covered on the circuit mounting area; a liquid crystal display screen and a circuit board of the intelligent storage battery are sequentially and flatly mounted on an inner lateral surface of a top plate of the cap; a conductive adhesive tape is clamped between one end of the liquid crystal display screen and a corresponding lateral plate of the cap; a connection terminal which is in corresponding contact with a bottom of the conductive adhesive tape for electrical connection and is formed by copper-cladding is arranged on the circuit board; characterized in that the top plate is an inclined plate which is inclined downward and outward.

There is an included angle of 5-15 degrees between the inclined plate and a bottom plane of the upper cover body.

The liquid crystal display screen and the circuit board have a thickness direction which is perpendicular to the inclined plate; the conductive adhesive tape and a corresponding lateral surface of the liquid crystal display screen are flatly juxtaposed to each other; there is a gap between a portion of the circuit board corresponding to the bottom of the conductive adhesive tape and an edge of the circuit board.

There are two terminal mounting areas; the circuit mounting area is located between the two terminal mounting areas; a mounting bracket is disposed at each of two ends of the circuit mounting area corresponding to the two terminal mounting areas; there is a gap between each of the mounting brackets and the corresponding terminal mounting area; each of the mounting brackets has a pair of separately disposed mounting blocks; a mounting opening is provided between each of the pairs of mounting blocks for mounting of a barbed connector at each of two ends of the cap; the barbed connector has a barb with an upward barbed portion; each of the pairs of mounting blocks is provided with a slot corresponding to the barb at a corresponding lateral surface thereof; the barbed connector has a mounting ear projecting from the mounting bracket; there is a gap between a bottom of the mounting ear and a bottom of the circuit mounting area.

An end plate at each of the two ends of the cap has a notch for receiving the barbed connector; the barbed connector is indented inwardly slightly and leaves a projecting edge at the top plate of the cap; each of the mounting ears is located at an outer lower portion of the barbed connector; there is a gap between the each of the mounting ears and the top plate of the cap.

The bottom of the circuit mounting area is provided with wireways which respectively extend from the corresponding mounting opening to the corresponding terminal mounting area; the mounting ears respectively cover the corresponding wireways, and each of the bottoms of the mounting ears provides an arc groove corresponding to the wireway.

With the structural improvement of an upper cover of an intelligent storage battery of the present invention, the top plate of the cap at the battery mounting position is an inclined plate which is inclined downward and outward. In comparison with horizontally-disposed plate in the prior art, an inclined plate which is inclined downward and outward has a larger mounting area, and can be correspondingly provided with a liquid crystal display screen with a larger area, so that the display effect of the liquid crystal display screen is better. Meanwhile, the inclined plate design allows the circuit board to have a larger design area, thus the required components can be arranged more conveniently and function extension is possible, and requirements for industrial arts such as wire arrangement width and distance between wires can be lowered, thereby reducing production costs.

Further, in the present invention, the thickness direction of the liquid crystal display screen is perpendicular to the inclined plate. The conductive adhesive tape and the corresponding lateral surface of the liquid crystal display screen are flatly juxtaposed to each other. There is a gap between a portion of the circuit board corresponding to the bottom of the conductive adhesive tape and an edge of the circuit board, i.e., the conductive adhesive tape is staggered with the edge of the circuit board, and is in large-area reliable contact with the connection terminal formed by cladding copper on the circuit board. The reliability of electrical connection between the conductive adhesive tape and the connection terminal is improved.

Further, in the present invention, the barbed connectors can be easily pressed and snapped into the mounting brackets; besides, the barbed connectors have mounting ears projecting from the mounting brackets, and there are gaps between the mounting ears and the corresponding terminal mounting areas. Thus, after the battery is mounted to the terminal, tools can be directly inserted from the gaps. The barbs can be detached from the slots by pressing the mounting ears downward, thus removal of the cap is easier.

Further, in the present invention, the end plates at both ends of the cap each has a notch for receiving the barbed connector. The barbed connector is indented inwardly slightly and leaves a projecting edge at the top plate of the cap. Each of the mounting ears is located at an outer lower portion of the barbed connector. There is a gap between each of the mounting ears and the top plate of the cap. When inserting tools from the gaps between the mounting ears and the terminals to press the mounting ears downward, then using the tools to pick upward inside the gaps between the mounting ears and the top plate of the cap, and after the tools reach the projection edge of the top plate of the cap, the cap could be pried upward to be detached from the mounting brackets. Removal is very easy and convenient. The risk that the cap cannot be removed when the battery terminal blocks the snaps after the battery terminal installation is avoided.

Further, the bottom of the circuit mounting area is provided with wireways which respectively extend from the corresponding mounting opening to the corresponding terminal mounting area. The mounting ears respectively cover the corresponding wireways, and each of the bottoms of the mounting ears provides an arc groove corresponding to the wireway. The mounting ears not only serve to conceal the wire in the wireways to improve aesthetics of the upper cover but also protect the wires to a certain extent.

DETAILED DESCRIPTION OF THE INVENTION

As shown in FIGS. 1-5, the structural improvement of an upper cover of an intelligent storage battery of the present invention comprises an upper cover body 1 with a liquid adding tank disposed on an upper surface thereof. The liquid adding tank is provided with a cover 11. The upper surface of the upper cover body 1 is also provided with a circuit mounting area 12 and terminal mounting areas 13.

The liquid adding tank is arranged on a side of a width direction of the upper cover body 1, the length of which approximately equals the length of the upper cover body 1, and the width of which is about two-third of the width of the upper cover body 1. There are two terminal mounting areas 13. The circuit mounting area 12 is located between the two terminal mounting areas 13. The circuit mounting area 12 and the two terminal mounting areas 13 are distributed on another side of the width direction of the upper cover body 1. The total length of the circuit mounting area 12 and the two terminal mounting areas 13 also approximately equals the length of the upper cover body 1.

Figure 1:
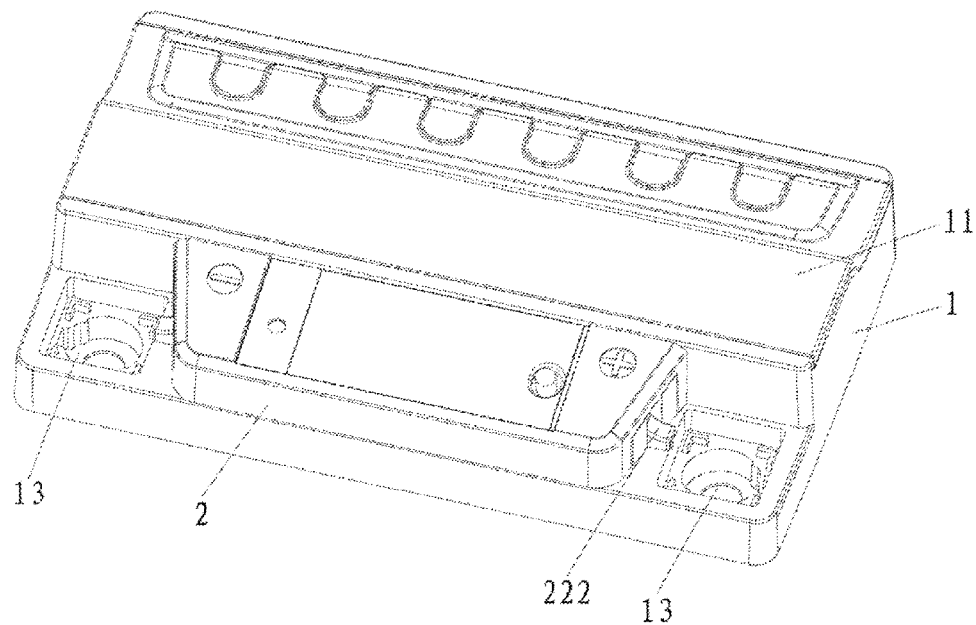
FIG. 1 illustrates the structure of the present invention.
Figure 2:
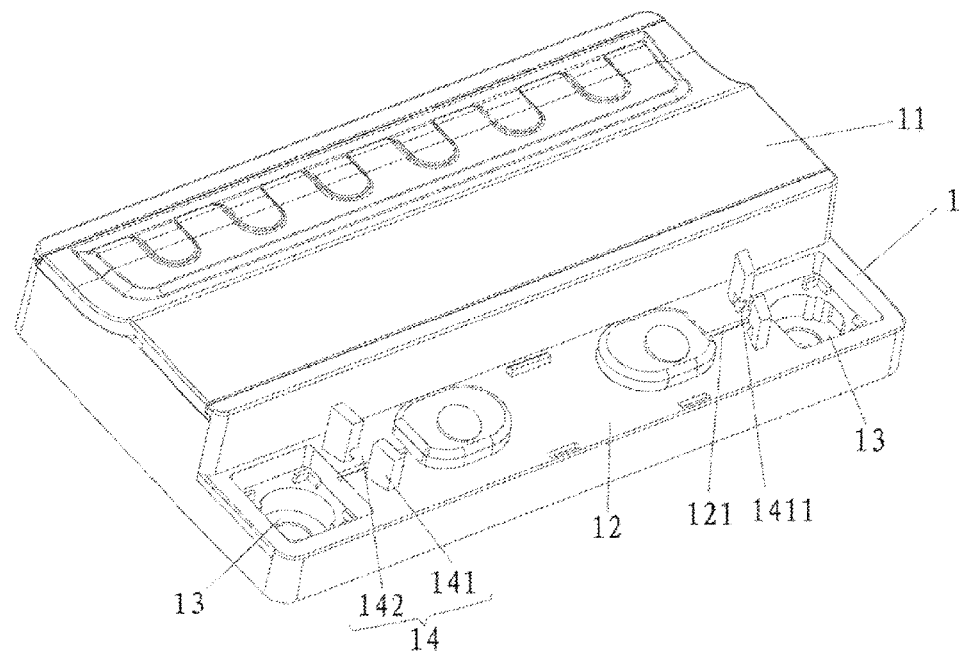
FIG. 2 illustrates the structure of the upper cover body of the present invention.
Figure 3:
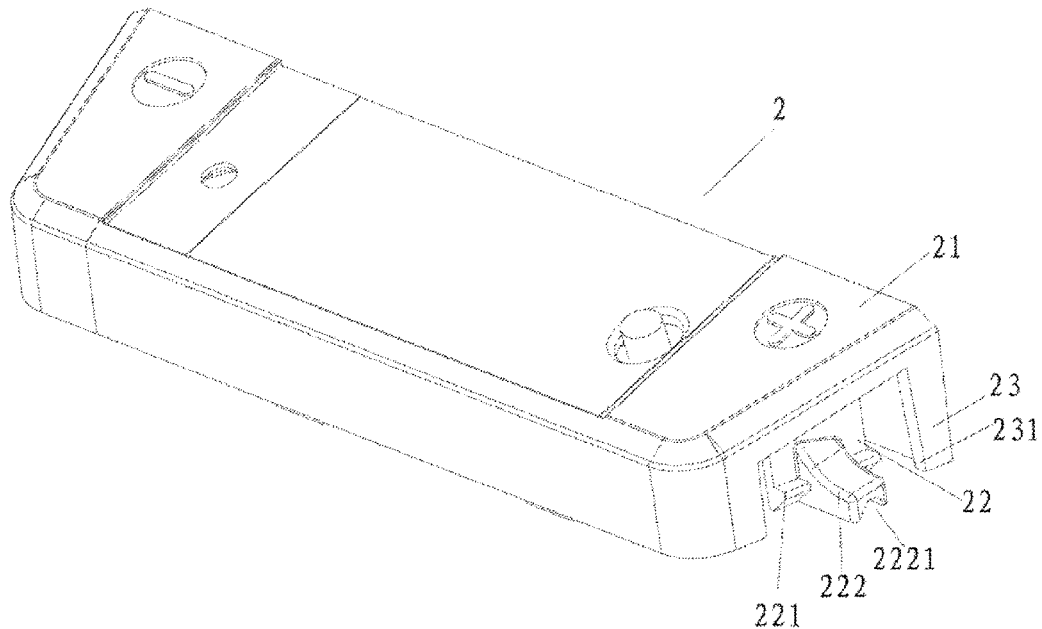
FIG. 3 illustrates the structure of the cap of the present invention.
Figure 4:
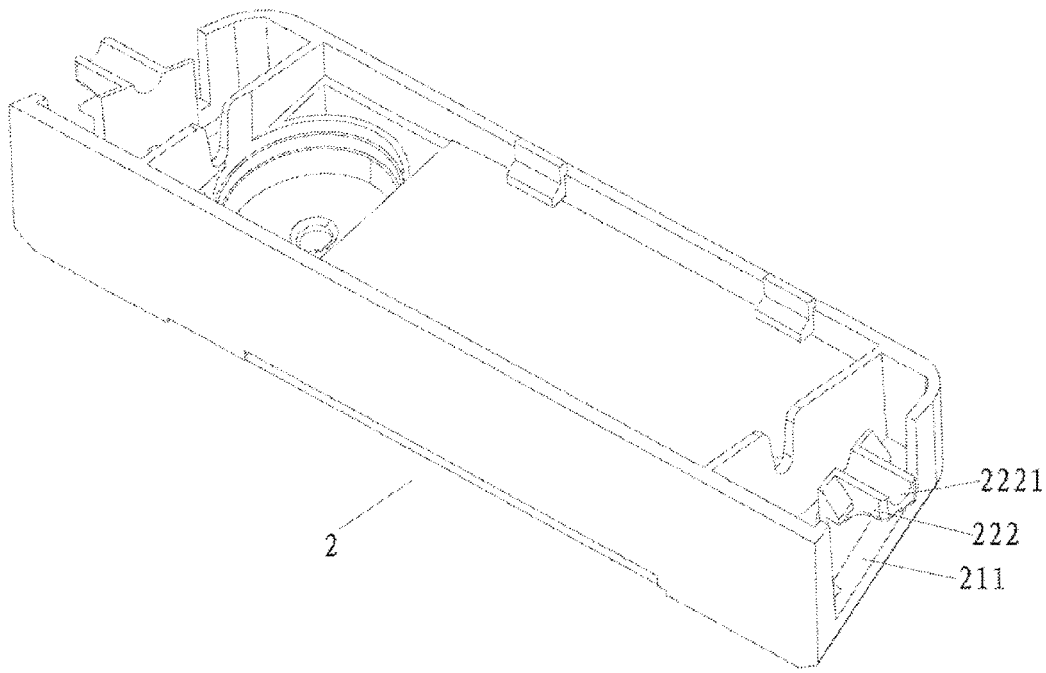
FIG. 4 illustrates the structure of the cap of the present invention from another angle.
Figure 5:
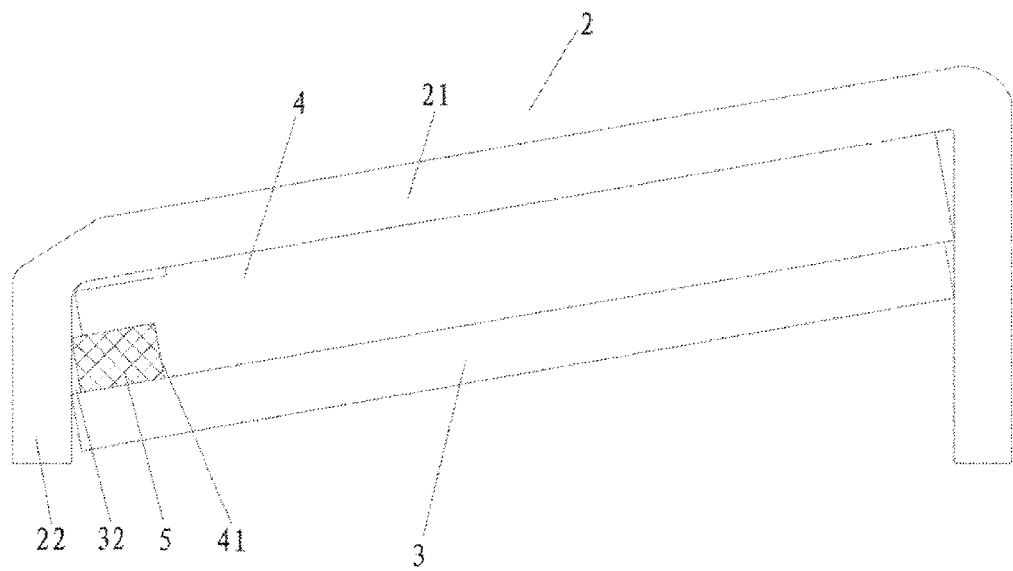
FIG. 5 illustrates the mounting of the cap, the conductive adhesive tape and the circuit board of the present invention.
Figure 6:
FIG. 6 illustrates the mounting of the cap, the conductive adhesive tape and the circuit board of the prior art.
Figure 7:
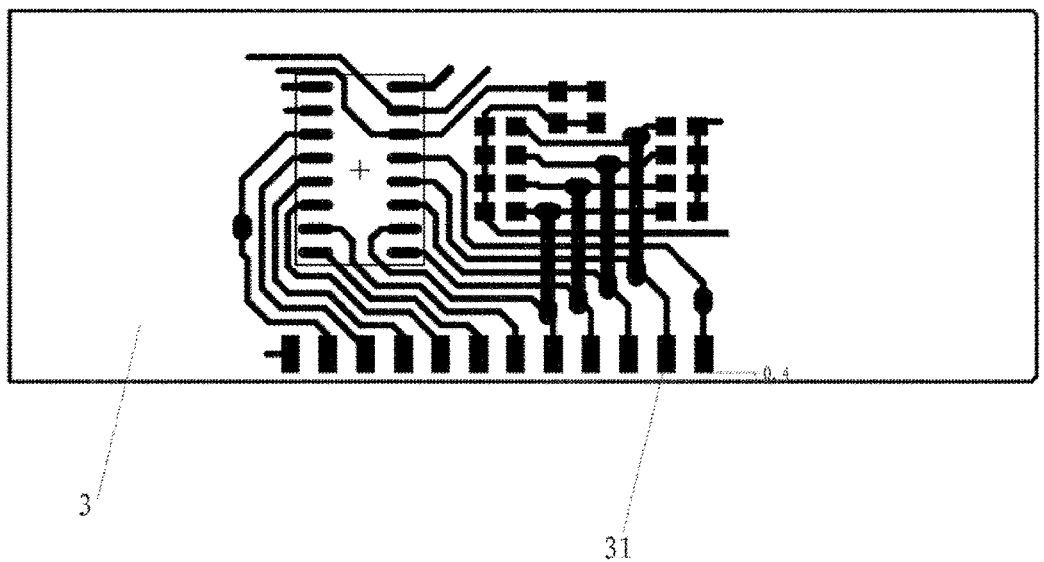
FIG. 7 illustrates the copper-cladding on the circuit board surface of the intelligent battery.

As shown in FIGS. 1, 2 and 5, a cap 2 is fixedly covered on the circuit mounting area 12. A liquid crystal display screen 4 and a circuit board 3 of the intelligent storage battery are sequentially and flatly mounted on an inner lateral surface of a top plate 21 of the cap 2. The top plate 21 is an inclined plate which is inclined downward and outward. Specifically, the included angle between the top plate 21 and a bottom plane of the upper cover body 1 is 5-15 degrees. The thickness direction of the liquid crystal display screen 4 and the circuit board 3 is perpendicular to the top plate 21. A left end of the liquid crystal display screen 4 is provided with a positioning step. A lateral surface 4 of the positioning step facing a left lateral plate 22 of the cap 2 is also perpendicular to the top plate 21. A conductive adhesive tape 5 is clamped between the positioning step and the left lateral plate 22 of the cap 2. A corresponding side of the conductive adhesive tape 5 is flatly juxtaposed to the lateral surface 41 of the positioning step. A connection terminal 31 which is in corresponding contact with the bottom of the conductive adhesive tape 5 for electrical connection and is formed by copper-cladding is arranged on the circuit board 3 (as shown in FIG. 7). The distance between the connection terminal 31 and the edge of the corresponding lateral side (left lateral side) of the circuit board 3 is about 0.4 mm. Owing to the inclined design of the top plate 21, the top plate 21 has a larger mounting area, and can be correspondingly provided with a liquid crystal display screen 4 with a large area, so that the display effect of the liquid crystal display screen 4 is better; on the other hand, there is a gap 32 between the portion of the circuit board 3 corresponding to the bottom of the conductive adhesive tape 5 and the edge of circuit board 3. By properly selecting the angle of inclination of the top plate 21, the bottom of the conductive adhesive tape 5 can be in full contact with the connection terminal 31 for reliable electrical connection.

A mounting bracket 14 is disposed at each of two ends of the circuit mounting area 12 corresponding to the two terminal mounting areas 13. There is a gap between each of the mounting brackets 14 and the correspondingly terminal mounting area 13. Each of the mounting brackets 14 has a pair of separately disposed mounting blocks 141. A mounting opening 142 is provided between each of the pairs of mounting blocks 141 for mounting of a barbed connector 22 at each of the two ends of the cap 2. The barbed connector 22 has a barb 221 with an upward barbed portion. Each of the pairs of mounting blocks 14 is provided with a slot 1411 corresponding to the barb 221 at an inner lateral surface thereof. The barbed connector 22 has a mounting ear 222 projecting from the mounting bracket 14; there is a gap between an outer end of the mounting ear 222 and the correspondingly terminal mounting area 13 (as the gap is relatively small, it is not obvious in the figures); there is a gap between a bottom of the mounting ear 222 and the bottom of the circuit mounting area 12 (not shown in the figures).

An end plate 23 at each of the two ends of the cap 2 has a notch 231 for receiving the barbed connector 22. The barbed connector 22 is indented inwardly slightly and leaves a projecting edge 211 at the top plate 21 of the cap. Each of the mounting ears 222 is located at an outer lower portion of the barbed connector 22. There is a gap between each of the mounting ears 222 and the top plate 21 of the cap.

The bottom of the circuit mounting area 12 is provided with wireways 121 which respectively extend from the corresponding mounting opening 142 to the corresponding terminal mounting area 13. The mounting ears 222 respectively cover the corresponding wireways 121, and each of the bottoms of the mounting ears 222 provides an arc groove 2221 corresponding to the wireway 121. The mounting ears 222 not only serve to conceal the wire in the wireways 121 to improve aesthetics of the upper cover but also protect the wires to a certain extent.

When in use, align the mounting ears 222 respectively with the corresponding mounting openings 142 and press them downward to press and snap the barbs 221 of the barbed connectors 22 into the slots 1411 of the mounting blocks 141, thereby completing installation of the cap 2. To remove the cap 2 after the battery is mounted to the terminals, tools can be directly inserted from the gaps between the cap 2 and the corresponding terminal mounting areas 13, and the barbs 221 can be detached from the slots 1411 by pressing the mounting ears 222 downward; then use the tools to pick upward inside the gaps between the mounting ears 222 and the top plate 21 of the cap; after the tools reach the projecting edge 211 of the top plate 21 of the cap 2, the cap 2 could be pried upward to be detached from the mounting brackets 14. Removal is very easy and convenient.

What is claimed is:

1. A structural improvement of an upper cover of an intelligent storage battery comprises an upper cover body with a liquid adding tank disposed on an upper surface thereof; the upper surface of the upper cover body is also provided with a circuit mounting area and terminal mounting areas; a cap is fixedly covered on the circuit mounting area; a liquid crystal display screen and a circuit board of the intelligent storage battery are sequentially and flatly mounted on an inner lateral surface of a top plate of the cap; a conductive adhesive tape is clamped between one end of the liquid crystal display screen and a corresponding lateral plate of the cap; a connection terminal which is in corresponding contact with a bottom of the conductive adhesive tape for electrical connection and is formed by copper-cladding is arranged on the circuit board; characterized in that the top plate is an inclined plate which is inclined downward and outward.

2. The structural improvement of an upper cover of an intelligent storage battery as in claim 1, characterized in that there is an included angle of 5-15 degrees between the inclined plate and a bottom plane of the upper cover body.

3. The structural improvement of an upper cover of an intelligent storage battery as in claim 1, characterized in that the liquid crystal display screen and the circuit board have a thickness direction which is perpendicular to the inclined plate; the conductive adhesive tape and a corresponding lateral surface of the liquid crystal display screen are flatly juxtaposed to each other; there is a gap between a portion of the circuit board corresponding to the bottom of the conductive adhesive tape and an edge of the circuit board.

4. The structural improvement of an upper cover of an intelligent storage battery as in claim 1, characterized in that there are two terminal mounting areas; the circuit mounting area is located between the two terminal mounting areas; a mounting bracket is disposed at each of two ends of the circuit mounting area corresponding to the two terminal mounting areas; there is a gap between each of the mounting brackets and the corresponding terminal mounting area; each of the mounting brackets has a pair of separately disposed mounting blocks; a mounting opening is provided between each of the pairs of mounting blocks for mounting of a barbed connector at each of two ends of the cap; the barbed connector has a barb with an upward barbed portion; each of the pairs of mounting blocks is provided with a slot corresponding to the barb at a corresponding lateral surface thereof; the barbed connector has a mounting ear projecting from the mounting bracket; there is a gap between a bottom of the mounting ear and a bottom of the circuit mounting area.

5. The structural improvement of an upper cover of an intelligent storage battery as in claim 4, characterized in that an end plate at each of the two ends of the cap has a notch for receiving the barbed connector; the barbed connector is indented inwardly slightly and leaves a projecting edge at the top plate of the cap; each of the mounting ears is located at an outer lower portion of the barbed connector; there is a gap between the each of the mounting ears and the top plate of the cap.

6. The structural improvement of an upper cover of an intelligent storage battery as in claim 4, characterized in that the bottom of the circuit mounting area is provided with wireways which respectively extend from the corresponding mounting opening to the corresponding terminal mounting area; the mounting ears respectively cover the corresponding wireways, and each of the bottoms of the mounting ears provides an arc groove corresponding to the wireway.

* * * * *